US011132072B2

(12) United States Patent
Jeon et al.

(10) Patent No.: US 11,132,072 B2
(45) Date of Patent: Sep. 28, 2021

(54) ELECTRONIC DEVICE FOR PAIRING WITH STYLUS PEN AND METHOD THEREOF

(71) Applicant: Samsung Electronics Co., Ltd., Gyeonggi-do (KR)

(72) Inventors: Hojin Jeon, Gyeonggi-do (KR); Donghoon Kang, Gyeonggi-do (KR); Zion Kwon, Gyeonggi-do (KR); Jeonghoon Kim, Gyeonggi-do (KR); Sangmin Shin, Gyeonggi-do (KR); Yeunwook Lim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/553,865

(22) Filed: Aug. 28, 2019

(65) Prior Publication Data

US 2020/0103988 A1   Apr. 2, 2020

(30) Foreign Application Priority Data

Sep. 28, 2018   (KR) .................. 10-2018-0115940

(51) Int. Cl.
*G06F 3/0354*     (2013.01)
*G06F 3/038*      (2013.01)
(Continued)

(52) U.S. Cl.
CPC .......... *G06F 3/03545* (2013.01); *G06F 3/038* (2013.01); *G06F 3/046* (2013.01);
(Continued)

(58) Field of Classification Search
CPC .. G06F 3/04162; G06F 3/03545; G06F 3/038; G06F 3/046; G06F 3/0482;
(Continued)

(56) References Cited

U.S. PATENT DOCUMENTS 9,495,024 B2   11/2016   Watanabe
9,652,058 B2    5/2017   Watanabe
(Continued)

FOREIGN PATENT DOCUMENTS

EP      3 211 509      8/2017
KR    1020100016670   2/2010
(Continued)

OTHER PUBLICATIONS

International Search Report dated Dec. 2, 2019 issued in counterpart application No. PCT/KR2019/009618, 11 pages.
(Continued)

*Primary Examiner* — Alexander Eisen
*Assistant Examiner* — Nathaniel P Brittingham
(74) *Attorney, Agent, or Firm* — The Farrell Law Firm, P.C.

(57) ABSTRACT

An electronic device is provided, which includes a housing including an inner space and a hole connected with the inner space, a first conductive coil, a first wireless communication circuitry, a first electro-magnetic resonance (EMR) communication control circuitry, a processor operatively connected with the first EMR communication control circuitry and the first wireless communication circuitry, a memory operatively connected with the at least one processor, and a stylus pen which is insertable into the inner space through the hole. The memory includes instructions that, when executed, cause the processor to transmit or receive a signal by using the first EMR communication control circuitry.

15 Claims, 14 Drawing Sheets

(51) Int. Cl.
*G06F 3/046* (2006.01)
*G06F 3/041* (2006.01)
*G06F 3/0482* (2013.01)
*G06F 3/14* (2006.01)
*H04W 4/80* (2018.01)

(52) U.S. Cl.
CPC ........ *G06F 3/0482* (2013.01); *G06F 3/04162* (2019.05); *G06F 3/14* (2013.01); *G06F 2203/0384* (2013.01); *G06F 2203/04807* (2013.01); *H04W 4/80* (2018.02)

(58) Field of Classification Search
CPC ............... G06F 3/14; G06F 2203/0384; G06F 2203/04807; H04W 4/80
See application file for complete search history.

(56) References Cited

U.S. PATENT DOCUMENTS

| | | |
|---|---|---|
| 10,365,732 B2 | 7/2019 | Bernstein et al. |
| 10,509,492 B2 | 12/2019 | Zhang et al. |
| 10,521,384 B2 | 12/2019 | Chan |
| 10,659,589 B2 | 5/2020 | Jeganathan et al. |
| 2008/0167088 A1 | 7/2008 | Rabu et al. |
| 2010/0078379 A1 | 4/2010 | Rocklitz |
| 2010/0261466 A1* | 10/2010 | Chang ................ G06F 3/04886 455/420 |
| 2014/0028617 A1* | 1/2014 | Kim ..................... G06F 3/1454 345/174 |
| 2015/0002425 A1* | 1/2015 | Lee ........................ G06F 3/046 345/173 |
| 2015/0050879 A1* | 2/2015 | MacDuff ............... H04W 12/06 455/39 |
| 2015/0363012 A1* | 12/2015 | Sundara-Rajan ... G06F 3/04162 345/179 |
| 2016/0109968 A1 | 4/2016 | Roh et al. |
| 2016/0299583 A1 | 10/2016 | Watanabe |
| 2016/0309286 A1 | 10/2016 | Son et al. |
| 2016/0337496 A1 | 11/2016 | Jeganathan et al. |
| 2016/0364025 A1 | 12/2016 | Bernstein et al. |
| 2017/0060274 A1 | 3/2017 | Watanabe |
| 2017/0078300 A1* | 3/2017 | He ........................ G06F 13/385 |
| 2017/0115755 A1 | 4/2017 | Jung et al. |
| 2017/0153763 A1* | 6/2017 | Vavra .................... G06F 3/0488 |
| 2017/0249029 A1 | 8/2017 | Watanabe |
| 2017/0255581 A1 | 9/2017 | Chan |
| 2018/0032163 A1* | 2/2018 | Park ....................... G06F 3/044 |
| 2018/0089471 A1* | 3/2018 | Chiarella ................ G06F 21/83 |
| 2019/0018508 A1 | 1/2019 | Watanabe |
| 2020/0050338 A1 | 2/2020 | Choi et al. |
| 2020/0064933 A1 | 2/2020 | Zhang et al. |
| 2020/0125190 A1 | 4/2020 | Jung et al. |

FOREIGN PATENT DOCUMENTS

| | | | |
|---|---|---|---|
| KR | 20130053513 A | * | 5/2013 |
| KR | 1020130053513 | | 5/2013 |
| KR | 1020160068099 | | 6/2016 |
| WO | WO 2016/200588 | | 12/2016 |

OTHER PUBLICATIONS

European Search Report dated Aug. 18, 2021 issued in counterpart application No. 19866923.6-1216, 10 pages.

* cited by examiner

ELECTRONIC DEVICE FOR PAIRING WITH STYLUS PEN AND METHOD THEREOF

CROSS-REFERENCE TO RELATED APPLICATION(S)

This application is based on and claims priority under 35 U.S.C. § 119 to Korean Patent Application No. 10-2018-0115940, filed on Sep. 28, 2018, in the Korean Intellectual Property Office, the entire disclosure of which is incorporated herein by reference.

BACKGROUND

1. Field

The disclosure relates generally to an electronic device, and more particularly, to an electronic device that pairs with a stylus pen and a method thereof.

2. Description of Related Art

An electronic device may provide a user with an environment for inputting handwriting on a display of the electronic device using a stylus pen. The electronic device may receive an input of a stylus pen (or a digital pen) through an electro-magnetic resonance (EMR) scheme. For example, when the electronic device transmits a signal to a stylus pen and the transmitted signal is induced through a resonance circuit of the stylus pen, the electronic device receives and processes the induced signal in order to detect the input (e.g., a drawing input) of the stylus pen.

Additionally, an electronic device may be connected with a stylus pen using a short-range wireless communication protocol. For example, when the stylus pen supports a Bluetooth® or Bluetooth® low energy (BLE) protocol, the electronic device may pair with the stylus pen based on the Bluetooth® or BLE protocol. According to the pairing procedure of the Bluetooth® or BLE protocol, the electronic device searches for and detects at least one external electronic device, displays a list representing information on the detected at least one electronic device on the display, and pairs with an external electronic device (e.g., the stylus pen) selected from the displayed list by a user.

SUMMARY

The disclosure provides at least the advantages described below.

An aspect of the disclosure is to provide an electronic device that pairs with a stylus pen using a short-range wireless communication protocol without a user input, and a method for the same.

In accordance with an aspect of the disclosure, an electronic device is provided, which includes a housing including an inner space and a hole connected with the inner space, a first conductive coil, a first wireless communication circuitry, a first electro-magnetic resonance (EMR) communication control circuitry, a processor operatively connected with the first EMR communication control circuitry and the first wireless communication circuitry, a memory operatively connected with the at least one processor, and a stylus pen which is insertable into the inner space through the hole. The memory includes instructions that, when executed, cause the processor to transmit or receive a signal by using the first EMR communication control circuitry, and. The stylus pen includes a second conductive coil, a second EMR communication control circuitry electrically connected with the second conductive coil, a battery, and a second wireless communication circuitry. The second EMR communication control circuitry is configured to transmit or receive a signal through the second conductive coil.

In accordance with another aspect of the disclosure, an electronic device is provided, which includes a housing including an inner space and a hole connected with the inner space, a first conductive coil, a wireless communication circuitry, an EMR communication control circuitry, a processor operatively connected with the EMR communication control circuitry and the wireless communication circuitry, and a memory operatively connected with the at least one processor. The memory includes instructions that, when executed, cause the processor to sense, using the EMR communication control circuitry and the first conductive coil, that a stylus pen is inserted in the inner space through the hole, transmit, using the EMR communication control circuitry and the first conductive coil, a first signal including an identifier to the stylus pen, receive, using the wireless communication circuitry, a second signal including the identifier from the stylus pen, and perform a pairing operation with the stylus pen, based on a short-range wireless communication protocol, using the received identifier.

In accordance with another aspect of the disclosure, a method is provided for an electronic device. The method includes sensing that a stylus pen is inserted in an inner space of the electronic device using an EMR scheme, transmitting a first signal including an identifier to the stylus pen using the EMR scheme, receiving a second signal including the identifier from the stylus pen, based on a short-range wireless communication protocol, and performing a pairing operation with the stylus pen using the identifier, based on the short-range wireless communication protocol.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, various embodiments of the disclosure may be described with reference to accompanying drawings. However, those of ordinary skill in the art will understand that the disclosure is not limited to these embodiment, and modifications, equivalents, and/or alternatives of the various embodiments described herein may be made without departing from the scope and spirit of the disclosure.

Figure 1:
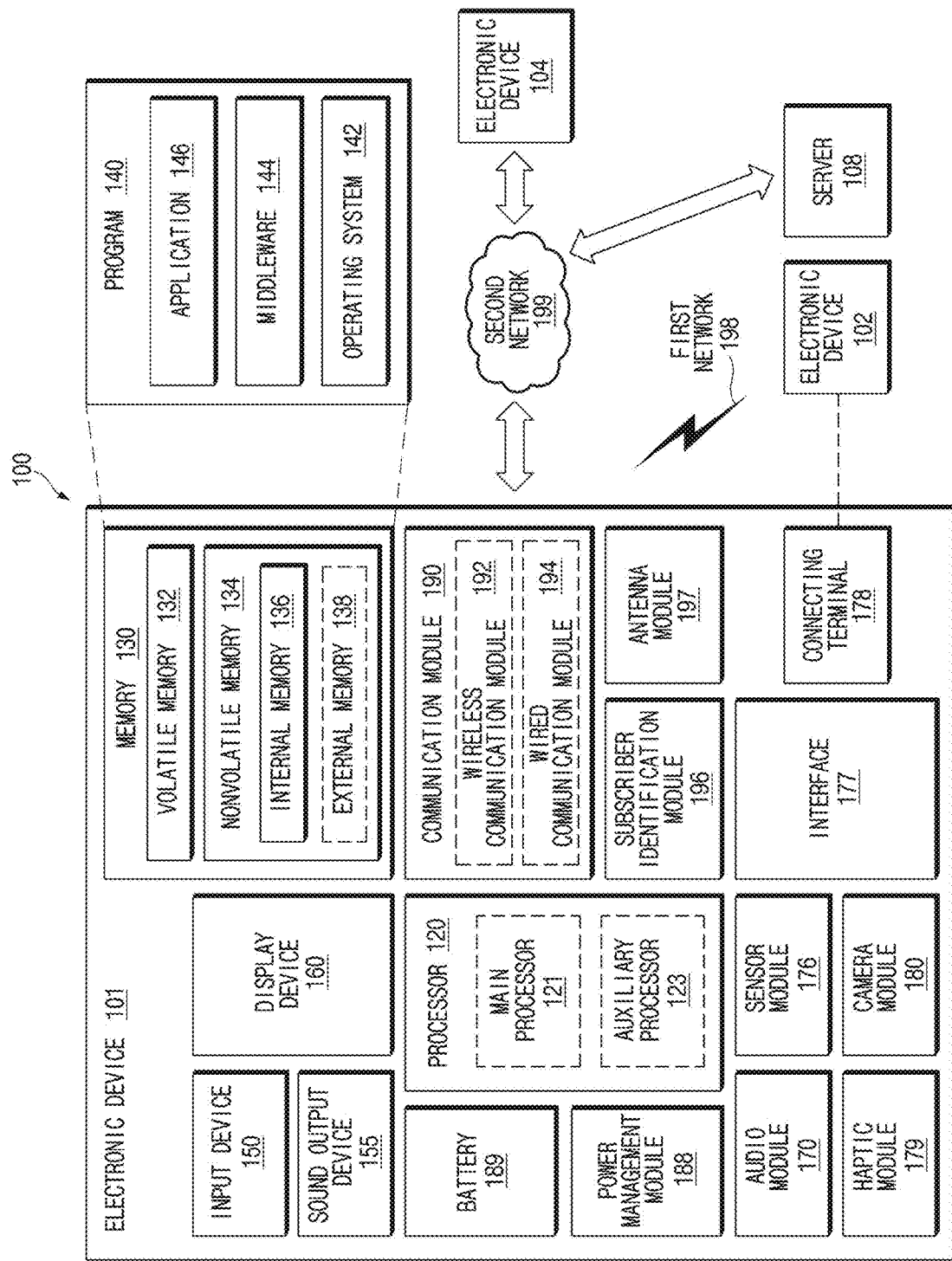
FIG. 1 is a block diagram illustrating an electronic device in a network environment, according an embodiment.

FIG. 1 is a block diagram illustrating an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic is device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth®, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
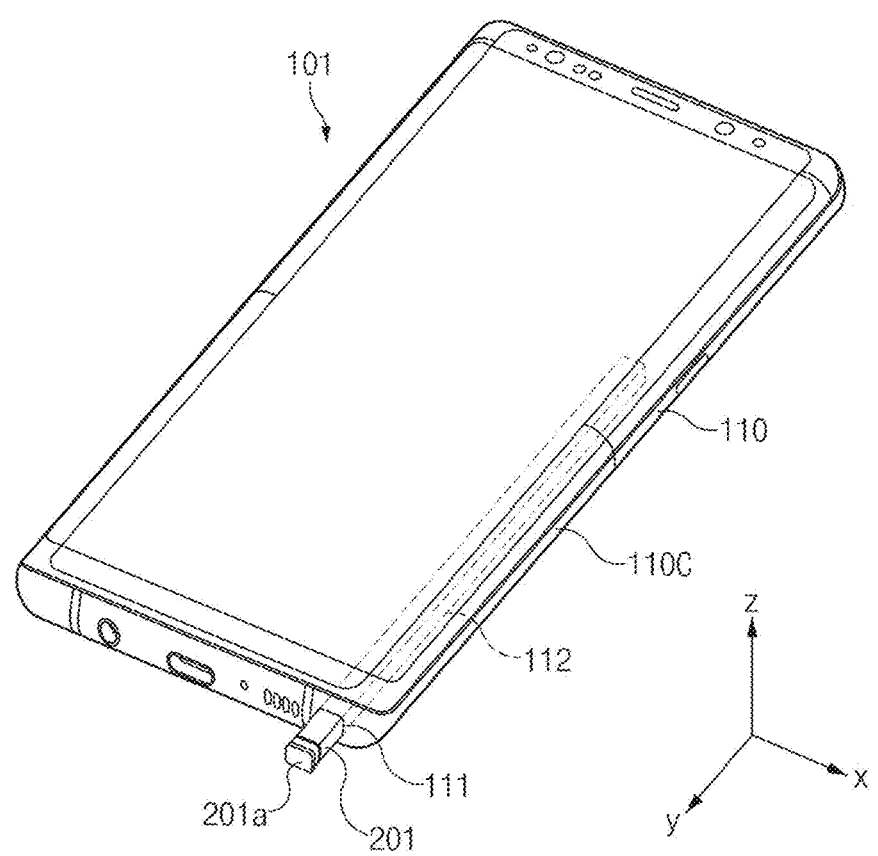
FIG. 2A illustrates an electronic device including a digital pen, according to an embodiment.

FIG. 2A illustrates an electronic device including a digital pen, according to an embodiment.

Referring to FIG. 2A, the electronic device 101 may include components illustrated in FIG. 1 and may include a structure in which the digital pen 201 (e.g., the stylus pen) is inserted. Additionally, the electronic device 101 includes a housing 110 and a hole 111 formed in a portion of the housing 110, e.g., a portion of a side surface 110C of the housing 110. The electronic device 101 includes a receiving space 112 connected with the hole 111, and the digital pen 201 may be inserted into the receiving space 112.

The digital pen 201 includes a button 201a, which is able to be pressed, provided at one end portion thereof such that the digital pen 201 is easily ejected from the receiving space 112 of the electronic device 101. When the button 201a is pressed, a repulsion mechanism (e.g., at least one spring), which is configured to link to the button 201a, acts such that the digital pen 201 is released from the receiving space 112.

Figure 2B:
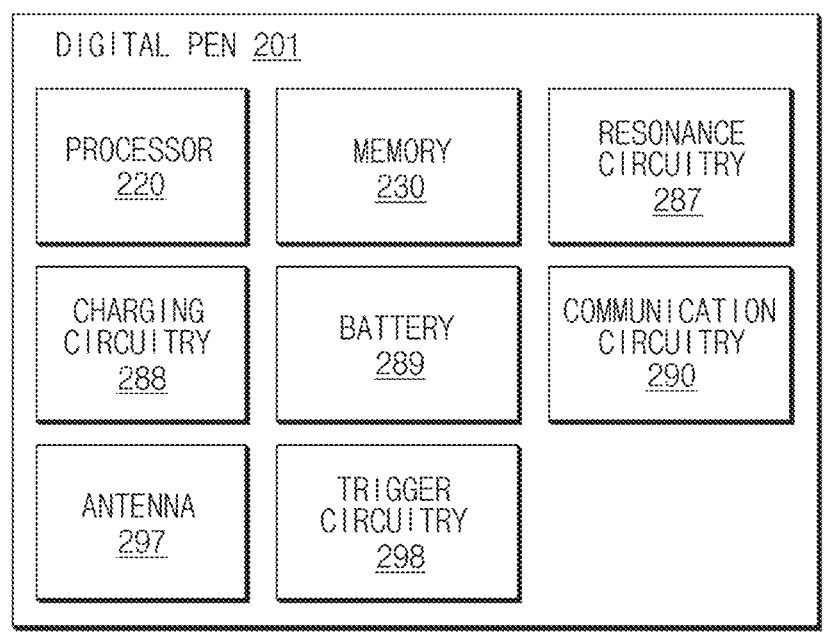
FIG. 2B illustrates a digital pen, according to an embodiment.

FIG. 2B illustrates a digital pen, according to an embodiment.

Referring to FIG. 2B, the digital pen 201 includes a processor 220, a memory 230, a resonance circuitry 287, a charging circuitry 288, a battery 289, a communication circuitry 290, an antenna 297, and/or a trigger circuitry 298. The processor 220, at least a portion of the resonance circuitry 287, and/or at least a portion of the communication circuitry 290 may be configured on a printed circuit board (PCB) or in the form of a chip. The processor 220, the resonance circuitry 287 and/or the communication circuitry 290 may be electrically connected with the memory 230, the charging circuitry 288, the battery 289, the antenna 297 or the trigger circuitry 298. Alternatively, the digital pen 201 may include only the resonance circuitry 287 and a button.

The processor 220 may include a customized hardware module or a generic processor configured to execute software (e.g., an application program). The processor 220 may include a hardware component (function) or software component (program) including at least one of various sensors, a data measurement module, an input/output interface, a module to manage the state or environment of the digital pen 201, or a communication module, which are provided in the digital pen 201. The processor 220 may include one or a combination of hardware, software, or firmware. The processor 220 may receive a proximity signal corresponding to an electro-magnetic field signal generated from a digitizer (e.g., at least a portion of the display device 160) of the electronic device 101 through the resonance circuitry 287. After the proximity signal is identified, the processor 220 may control the resonance circuitry 287 to transmit an EMR input signal to the electronic device 101.

The memory 230 may store information on the operation of the digital pen 201. The information may include information for the communication with the electronic device 101 and frequency information associated the input operation of the digital pen 201.

The resonance circuitry 287 may include at least one of a coil, an inductor, or a capacitor. The resonance circuitry 287 may be used for the digital pen 201 to generate a signal including the resonance frequency. For example, to generate a signal, the digital pen 201 may use at least one of an EMR scheme, an active electrostatic (AES) scheme, or an electrically coupled resonance (ECR) scheme. When the digital pen 201 transmits a signal through the EMR scheme, the digital pen 201 may generate a signal including a resonance frequency based on an electro-magnetic field generated from an inductive panel of the electronic device 101. When the digital pen 201 transmits a signal through the AES scheme, the digital pen 201 may generate a signal using capacity coupling with the electronic device 101. When the digital pen 201 transmits a signal through the ECR scheme, the digital pen 201 may generate a signal including a resonance frequency based on an electric field generated from a capacitive device of the electronic device. The resonance circuitry 287 may be used to change the intensity or frequency of the electro-magnetic field depending on the operation state of the user. For example, the resonance circuitry 287 may provide a frequency for recognizing a hovering input, a drawing input, a button input, or an erasing input.

When the charging circuitry 288 is connected with the resonance circuitry 287, the charging circuitry 288 may rectify the resonance signal generated from the resonance circuitry 287 to a direct current (DC) signal to be provided to the battery 289. The digital pen 201 may determine whether the digital pen 201 is inserted into the electronic device 101 using the voltage level of a DC signal sensed by the charging circuitry 288.

The battery 289 may be configured to store power required for operation of the digital pen 201. The battery 289 may include a lithium-ion battery, or a capacitor, and may be rechargeable or interchangeable. The battery 289 may be charged using the power supplied from the charging circuitry 288 (e.g., a DC signal (DC power)).

The communication circuitry 290 may be configured to perform a wireless communication function between the digital pen 201 and the communication module 190 of the electronic device 101. The communication circuitry 290 may transmit state information and input information of the digital pen 201 to the electronic device 101 through a short-range communication scheme. For example, the communication circuitry 290 may transmit direction information (e.g., motion sensor data) of the digital pen 201 obtained through the trigger circuitry 298, voice information input through the microphone, or information on a residual amount of the battery 289. For example, the short-range communication scheme may include at least one of Bluetooth®, BLE, or a wireless LAN.

The antenna 297 may be used to transmit or receive a signal or power to or from the outside (e.g., the electronic device 101).

The digital pen 201 may include a plurality of antennas 297 and may select at least one antenna 297 suitable for the communication scheme thereof. The communication circuitry 290 may exchange a signal or power with the external electronic device through the selected at least one antenna 297

The trigger circuitry 298 may include at least one button or sensor circuitry. The processor 220 may identify an input type (e.g., touching or pressing) or the type (e.g., an EMR button or BLE button) of the button of the digital pen 201.

The sensor circuitry may generate an electrical signal or data value corresponding to an internal operating state of the digital pen 201 or an external environmental condition of the digital pen 201. For example, the sensor circuitry may include at least one of a motion sensor, a battery level sensor, a pressure sensor, an optical sensor, a temperature sensor, a geomagnetic sensor, and a biometric sensor.

The trigger circuitry 298 may transmit a trigger signal to the electronic device 101 using an input signal of the button or a signal through the sensor.

Figure 3:
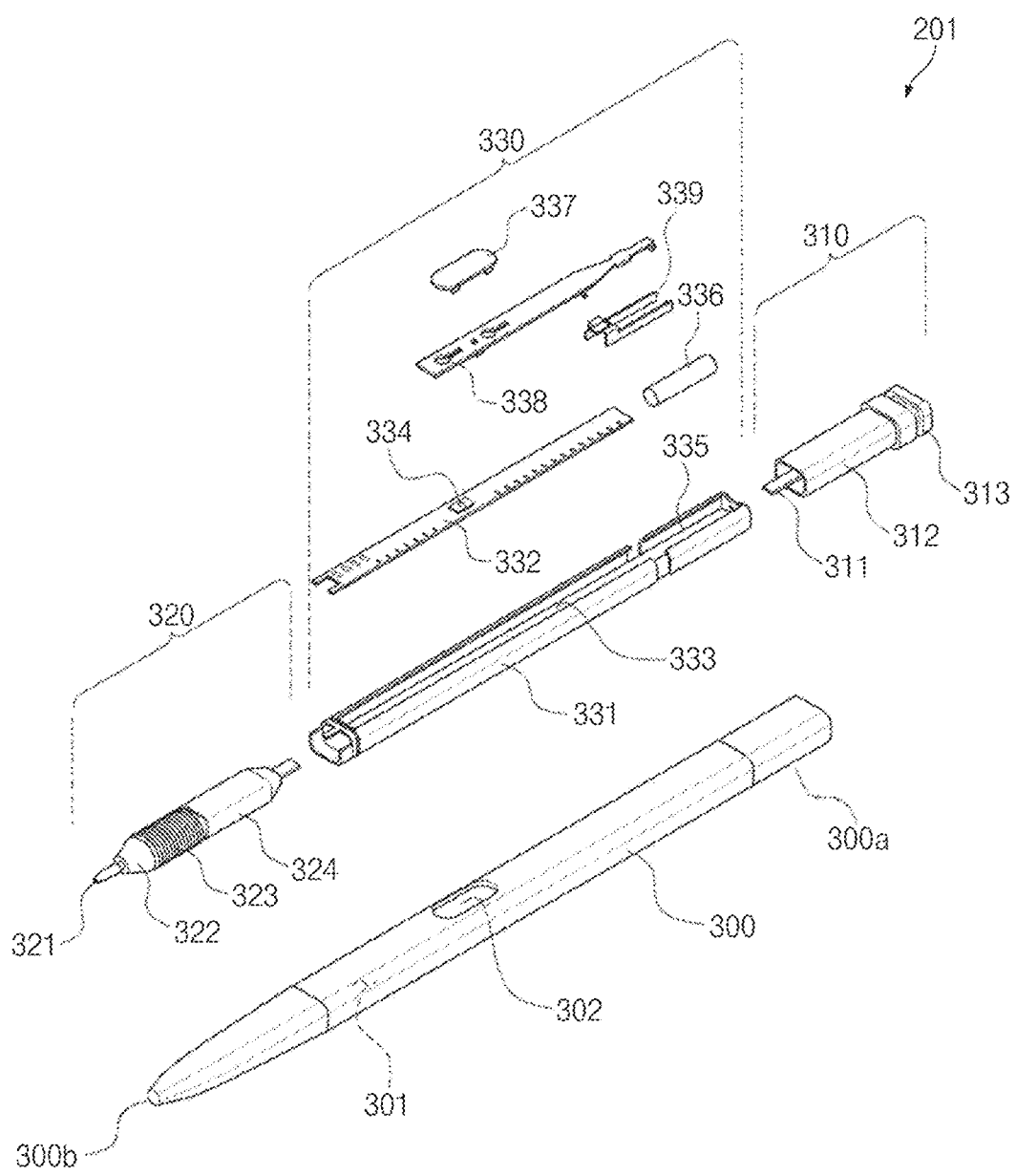
FIG. 3 illustrates a digital pen, according to an embodiment.

FIG. 3 illustrates a digital pen, according to an embodiment.

Referring to FIG. 3, the digital pen 201 includes a pen housing 300 forming the outer appearance of the digital pen 201 and an inner assembly of the pen housing 300. The inner assembly may include all of the various components mounted inside a pen and may be inserted into the pen housing 300 through a single assembling operation.

The pen housing 300 has a shape of longitudinally extending, between a first end 300a and a second end 300b and may include the receiving space therein. The sectional surface of the pen housing 300 may have the shape of an oval having a longer axis and a shorter axis, and may be formed in the shape of a substantially oval cylinder. A receiving space of the pen housing 300 may have the shape of an oval at the sectional surface thereof, corresponding to the shape of the pen housing 300. The pen housing 300 may include a synthetic resin (e.g., plastic) and/or a metallic material (e.g., aluminum (Al)). The second end 300b of the pen housing 300 may be formed of a synthetic resin material.

The inner assembly may have a shape longitudinally extending to correspond to the shape of the pen housing 300. The inner assembly may be mainly divided into three components in the longitudinal direction. For example, the inner assembly may include an ejection member 310 disposed at a position corresponding to the first end 300a of the pen housing 300, a coil part 320 disposed at a position corresponding to the second end 300b of the pen housing 300, and a circuit board part 330 disposed at a position corresponding to the body of the pen housing 300.

The ejection member 310 may include a component to release the digital pen 201 from the receiving space 112 of the electronic device 101. The ejection member 310 includes a shaft 311, an ejection body 312 disposed around the shaft 311 to form the whole outer appearance of the ejection member 310, and a button part 313. When the inner assembly is completely inserted into the pen housing 300, the part including the shaft 311 and the ejection body 312 is surrounded by the first end 300a of the pen housing 300, and the button part 313 (e.g., 201a in FIG. 2A) may be exposed to the outside of the first end 300a. A plurality of components, such as cam members or elastic members, which are provided inside the ejection body 312, may be disposed to form a push-pull structure. The button part 313 is substantially coupled to the shaft 311 and is able to reciprocate linearly with respect to the ejection body 312. The button part 313 may include a button having a locking structure such that a user releases the digital pen 201 using a nail.

The digital pen 201 may include a sensor that detects a linear reciprocating motion of the shaft 311, thereby providing another input scheme.

The coil part 320 includes a pen tip 321 exposed to the outside of the second end 300b when the inner assembly is completely inserted into the pen housing 300, a packing ring 322, a coil 323 wound multiple times and/or a pen pressure sensing unit 324 to obtain the variation in pressure as the pen tip 321 is pressed.

The packing ring 322 may include epoxy, rubber, urethane, or silicone. The packing ring 322 may be provided for the purpose of waterproofing and dustproofing and may protect the coil part 320 and the circuit board part 330 from dust or prevent water or moisture from being infiltrated into the coil part 320 and the circuit board part 330. The coil 323 may generate a resonance frequency at a set frequency band (e.g., 500 kHz) and may be combined with at least one device (e.g., a capacitive device) to adjust a resonance frequency, which is generated from the coil 323, within a specific frequency range.

The circuit board part 330 includes a printed circuit board 332, a base 331 surrounding at least one side of the printed circuit board 332, and an antenna 339. A board seating part 333, on which the printed circuit board 332 is seated, is formed on a top surface of the base 331, and the printed circuit board 332 is fixed in the state of being seated on the board seating part 333. The printed circuit board 332 may include a top surface and a bottom surface. A variable capacitor connected with the coil 323 or a switch 334 may be disposed on the top surface, and the charging circuitry, the battery, or the communication circuitry may be disposed on the bottom surface. The battery may include an electric double layered capacitor (EDLC). The charging circuitry is interposed between the coil 323 and the battery, and may include a voltage detector circuitry and a rectifier.

Figure 4:
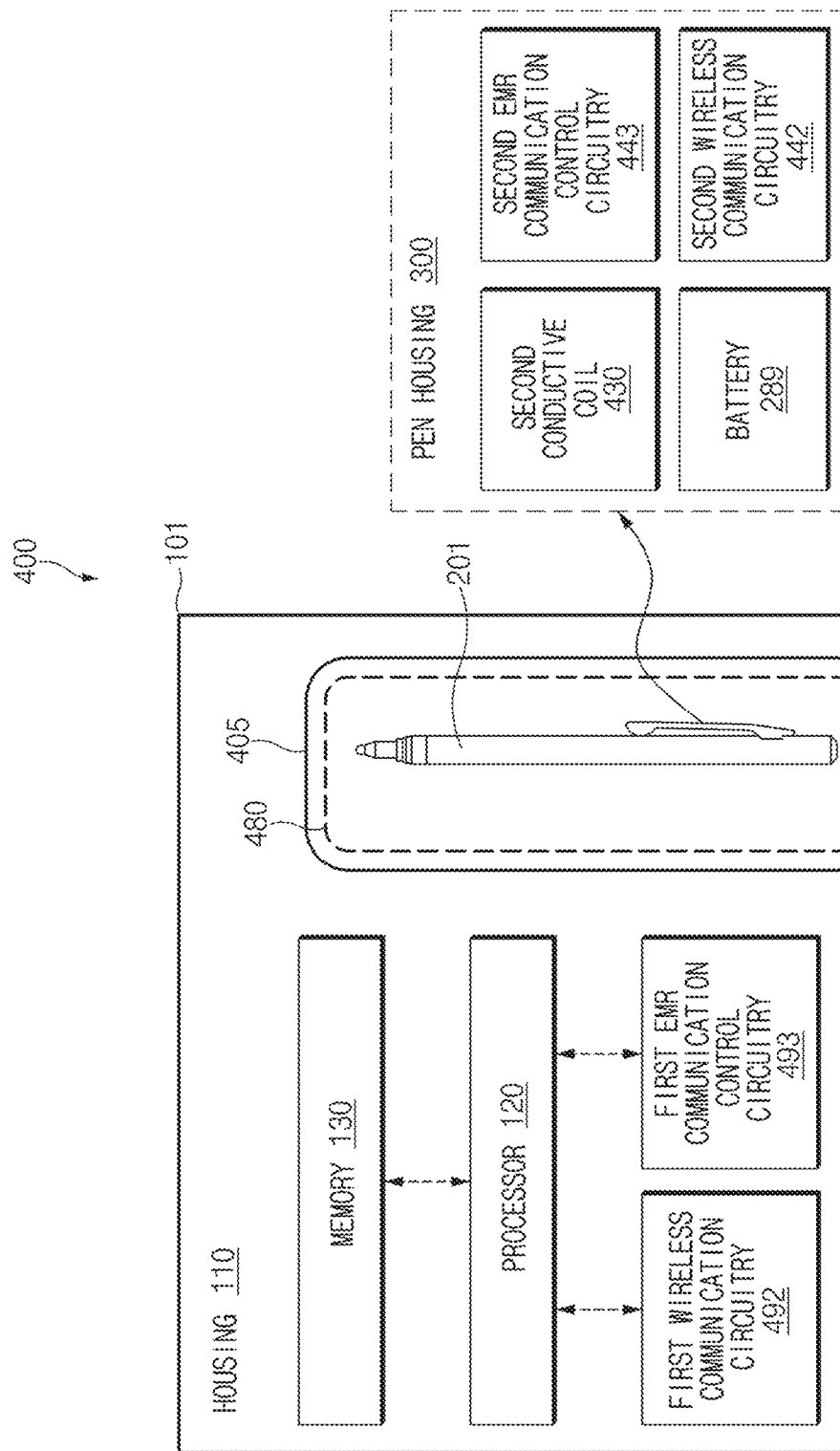
FIG. 4 illustrates an electronic device having a digital pen included in an inner space thereof, according to an embodiment.

The antenna 339 may include an antenna structure 339 as illustrated in FIG. 4 and/or an antenna embedded in the printed circuit board 332.

The switch 334 may be provided on the printed circuit board 332. A side button 337 provided on the digital pen 201 is used to press the switch 334 and may be exposed to the outside through a side opening 302 of the pen housing 300. The side button 337 may be supported by a supporting member 338. When there is no external force acting on the side button 337, the supporting member 338 provides restoring force to return or maintain the side button 337 to a specific position of the side button 337.

The circuit board part 330 may include a different packing ring, such as an O-ring. For example, O-rings formed of an elastic material may be disposed at opposite ends of the base 331 to form a sealing structure between the base 331 and the pen housing 300.

The supporting member 338 may be partially in close contact with the inner wall of the pen housing 300 around the side opening 302 to form a sealing structure. For example, the circuit board part 330 may also form a waterproof and dustproof structure similar to that of the packing ring 322 of the coil part 320.

The digital pen 201 may include a battery seating part provided on the top surface of the base 331, such that a battery 336 is disposed in the battery seating part. The battery 336, which is mounted on the battery seating part 335, may include a cylinder type battery.

The digital pen 201 may include a microphone. The microphone may be directly connected with the printed circuit board 332 or may be connected with a separate flexible printed circuit board (FPCB) connected with the PCB 332. The microphone may be disposed in a position parallel to the side button 337 while extending in the longitudinal direction of the digital pen 201.

FIG. 4 illustrates an electronic device having a digital pen included in an inner space thereof, according to an embodiment.

Referring to FIG. 4, in a network environment 400, the electronic device 101 includes, inside the housing 110, the processor 120, the memory 130, a first wireless communication circuitry 492, a first EMR communication control circuitry 493, and the inner space 405, into which the digital pen 201 is inserted through a hole. The electronic device 101 includes, inside the inner space 405, a first conductive coil 480 that transmits and receives a signal to and from the digital pen 201 using the EMR scheme.

The first wireless communication circuitry 492 may support a short-range wireless communication protocol. The short-range wireless communication protocol may be based on, for example, a Bluetooth® or BLE standard specification defined by the Bluetooth® special interest group (SIG).

The first EMR communication control circuitry 493 may exchange a signal together with the digital pen 201 based on the EMR scheme. The EMR scheme may include a passive EMR scheme or an active EMR scheme.

According to a passive EMR scheme, the first EMR communication control circuitry 493 may generate a signal having a specified frequency, and the signal having the specified frequency is received in the electronic device 101 after being transmitted through the first conductive coil 480 and induced to the second EMR communication control circuitry 443 of the digital pen 201.

According to an active EMR scheme, the second EMR communication control circuitry 443 generates a signal having a specified frequency and the signal having the specified frequency is transmitted to the electronic device 101 through a second conductive coil 430.

The first conductive coil 480 may perform an antenna function to transmit a signal to the digital pen 201 or to sense the signal transmitted from the digital pen 201. Alternatively, the first conductive coil 480 may transmit a signal for charging the battery 289 of the digital pen 201.

The processor 120 may be operatively coupled to the first wireless communication circuitry 492 and the first EMR communication control circuitry 493. The processor 120 may perform an overall function for pairing with the digital pen 201 by executing instructions stored in the memory 130.

For example, the processor 120 may sense whether the digital pen 201 is in the inner space 405 through the first EMR communication control circuitry 493 and the first conductive coil 480. The processor 120 may generate an identifier used for pairing, in response to sensing the digital pen 201, and transmit a first signal including the generated identifier, to the digital pen 201, through the first EMR communication control circuitry 493 and the first conductive coil 480. The processor 120 may pair with the digital pen 201 using the identifier, which is included in the first signal, without a user input. For example, when the digital pen 201 transmits a second signal including an identifier having the same value as that of the identifier included in the first signal, the processor 120 may determine that the device transmitting the second signal is the same as the digital pen 201 sensed inside the inner space 405. The processor 120 may omit the procedure for receiving the user input by pairing with the digital pen 201 without receiving a separate user input for determining the paired device.

The memory 130 may store instructions that cause the processor 120 to perform an overall function for pairing with the digital pen 201. The memory 130 may store the identifier generated by the processor 120.

The digital pen 201 includes the pen housing 300, and the second conductive coil 430, the second EMR communication control circuitry 443, the battery 289, and a second wireless communication circuitry 442 may be included inside the pen housing 300.

The second wireless communication circuitry 442 may support a short-range wireless communication protocol, e.g., a Bluetooth® or BLE standard specification.

The second EMR communication control circuitry 443 may exchange a signal with the electronic device 101 based on the EMR scheme. The EMR scheme may include the passive EMR scheme or the active EMR scheme.

When the digital pen 201 supports the passive EMR scheme, the signal received from the electronic device 101 may be induced to the second EMR communication control circuitry 443. When the digital pen 201 supports the active EMR scheme, the digital pen 201 may generate a signal having a specified frequency through the second EMR communication control circuitry 443.

The second conductive coil 430 may perform an antenna function to transmit a signal to the electronic device 101 or to sense a signal from the electronic device 101. For example, the second conductive coil 430 may receive, from the first conductive coil 480, a signal to charge the battery 289 of the digital pen 201.

Figure 5:
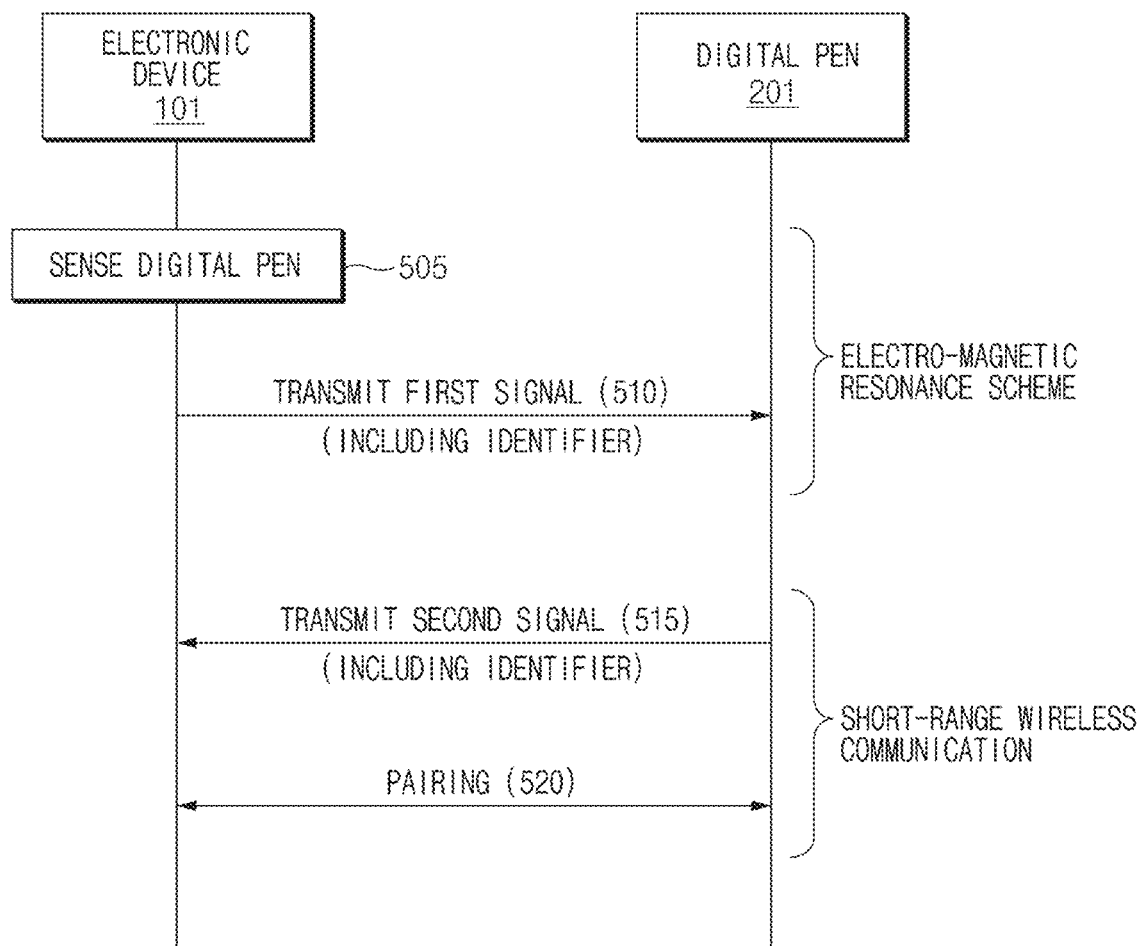
FIG. 5 is a signal flow diagram of an electronic device and a digital pen using a passive EMR scheme, according to an embodiment.

FIG. 5 is a signal flow diagram of an electronic device and a digital pen through a passive EMR scheme, according to an embodiment.

Referring to FIG. 5, the electronic device 101 and the digital pen 201 may perform operations 505 and 510 through an EMR scheme (e.g., a passive EMR scheme), and may perform operations 515 to 520 based on the short-range wireless communication protocol (e.g., a Bluetooth® or BLE).

More specifically, in operation 505, the electronic device 101 senses the digital pen 201. For example, the electronic device 101 may sense, through the first conductive coil 480 and the first EMR communication control circuitry 493, that the digital pen 201 is inserted into the inner space 405 of the electronic device 101 through the hole 221. The electronic device 101 may sense that the digital pen 201 is positioned on the display 160 of the electronic device 101, through a separate conductive coil included in an electro-magnetic resonance panel 890.

In operation 510, the electronic device 101 transmits the first signal including the identifier to the digital pen 201 through an EMR scheme. For example, the electronic device 101 may insert the identifier generated by the processor 120 into a first signal having a specified frequency through the first EMR communication control circuitry 493, and transmit the first signal to the second conductive coil 430 of the digital pen 201 through the first conductive coil 480.

In operation 515, the digital pen 201 transmits a second signal including an identifier to the electronic device 101 based on a short-range wireless communication protocol. For example, the digital pen 201 may insert an identifier having the same value as the identifier included in the first signal into the second signal, and may transmit, through the second wireless communication circuitry 442 and the second conductive coil 430, the second signal to the first wireless communication circuitry 492 of the electronic device 101. The second signal may include an advertising signal based on a short-range wireless communication protocol.

In operation 520, the electronic device 101 and the digital pen 201 perform pairing based on the short-range wireless communication protocol using the identifier. For example, when the identifier transmitted through the first signal and the identifier received through the second signal are the same, the processor 120 may determine that the entity having transmitted the second signal is the digital pen 201 and may pair with the digital pen 201 using the first wireless communication circuitry 492, without a separate user input.

Figure 6:
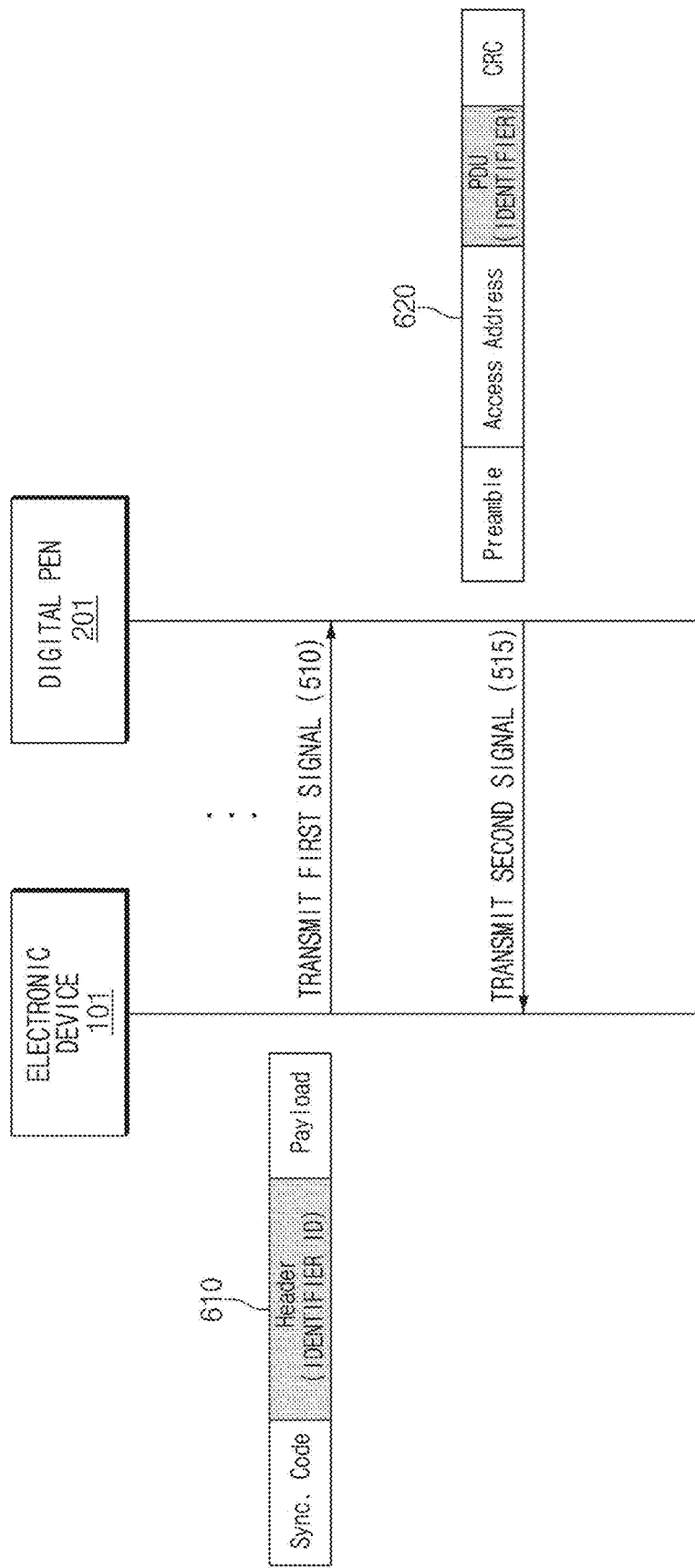
FIG. 6 illustrates packet types of a first signal and a second signal transmitted and received between an electronic device and a digital pen, according to an embodiment.

FIG. 6 illustrates packet types of a first signal and a second signal transmitted and received between an electronic device and a stylus pen, according to an embodiment.

Referring to FIG. 6, a first signal includes an EMR packet 610. The EMR packet 610 includes a sync code, a header, and a payload. The sync code may represent a value for synchronizing the resource (e.g., at least one of time or channel) that the packet is transmitted. The header may include control information of the packet. The payload may include message data of the packet. The electronic device 101 may insert an identifier into the header of the EMR packet 610. The data capacity of the EMR packet 610 transmitted through the EMR scheme may be limited, so at least one field other than the header including the identifier may be omitted from the EMR packet 610.

The second signal includes an advertising packet 620 complying with a Bluetooth® or BLE standard specification. The advertising packet 620 includes a preamble, an access address, a protocol data unit (PDU), and a cyclic redundancy check (CRC). The preamble may represent the information (e.g., gain control) required for the second signal to be stably transmitted and received, the access address may be used to identify a signal on the physical layer channel, and the CRC may be used to detect errors in the transmitted second signal. The PDU may be used to distinguish the second signal from another signal based on a short-range wireless communication protocol. The digital pen 201 may insert an identifier having the same value as the identifier included in the header of the first signal into the PDU. At least one field other than the PDU including the identifier may be omitted from the advertising packet 620.

Figure 7:
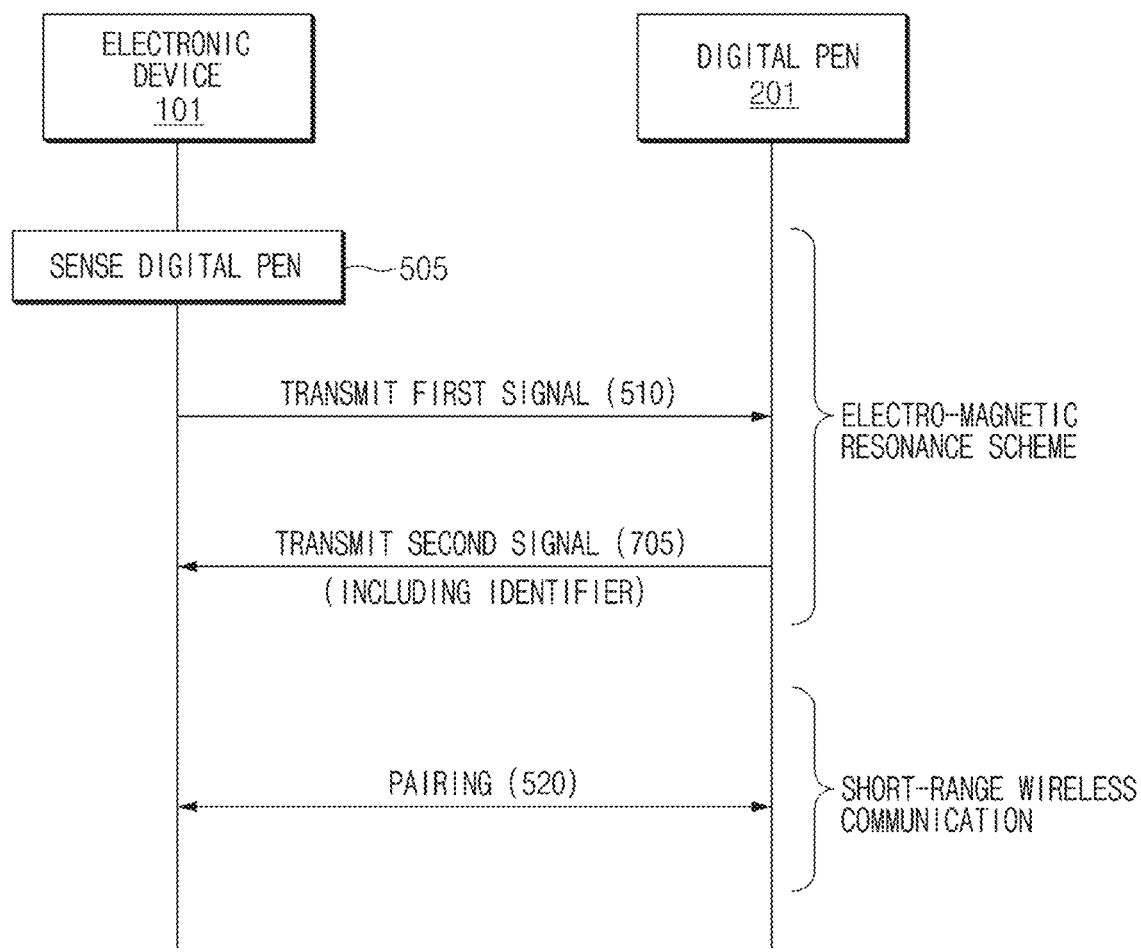
FIG. 7 is a signal flow diagram of an electronic device and a digital pen using an active EMR scheme, according to an embodiment.

FIG. 7 is a signal flow diagram of an electronic device and a digital pen using an active EMR scheme, according to an embodiment.

Referring to FIG. 7, after operations 505 and 510, the digital pen 201 transmits a second signal to the electronic device 101 based on the EMR scheme (e.g., the active EMR scheme) in operation 705. For example, the digital pen 201 may generate an identifier having the same value as the value of the identifier included in the first signal and a second signal including the identifier through the second EMR communication control circuitry 443 and may transmit the second signal trough the second conductive coil 430. As another example, the digital pen 201 may generate an identifier different from the identifier included in the first signal. In this case, the digital pen 201 may generate an identifier indicating the digital pen 201, and may insert the generated identifier into the second signal. The second signal may have the same packet structure as the advertising packet 620, or may have a separate packet structure.

In operation 520, the electronic device 101 pairs with the digital pen 201 using the short-range wireless communication protocol based on the identifier included in the second signal.

Figure 8:
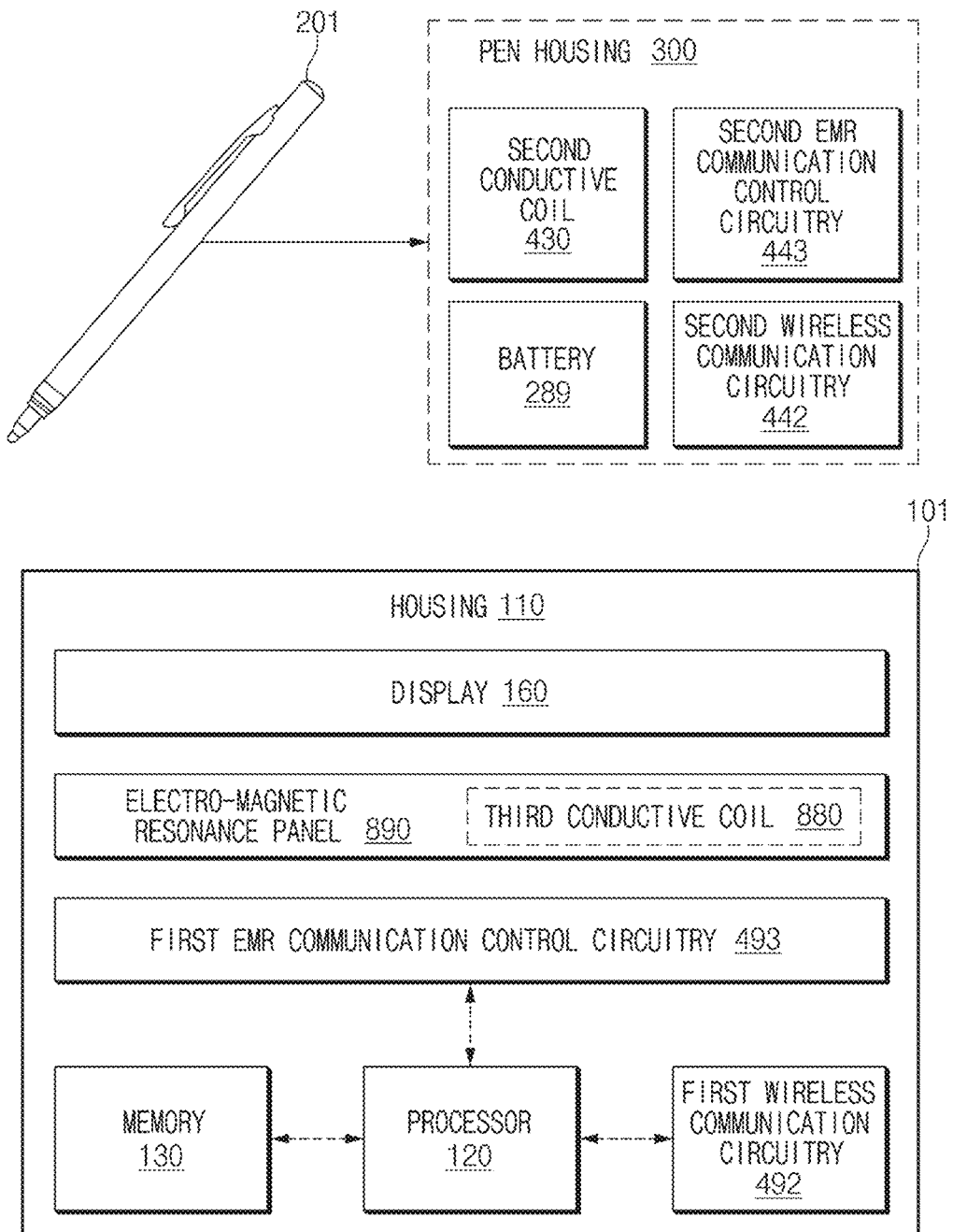
FIG. 8 illustrates an electronic device using an electromagnetic resonance panel, according to an embodiment.

FIG. 8 illustrates an electronic device using an electro-magnetic induction panel, according to an embodiment.

Referring to FIG. 8, the electronic device 101 includes the display 160 and an electro-magnetic resonance panel 890 (e.g., a digitizer).

The display 160 may be included inside the housing 110, or may be disposed to be viewed from the housing 110. The processor 120 may receive an input (e.g., a drawing input) of the digital pen 201 through the display 160 or may display a GUI indicating the connection state of the digital pen 201.

The electro-magnetic resonance panel 890 includes a third conductive coil 880. The electronic device 101 may sense the input of the digital pen 201 by receiving a signal having a specified frequency from the digital pen 201 through the third conductive coil 880 included in the electro-magnetic resonance panel 890.

For example, when the digital pen 201 supports a passive EMR scheme, the first EMR communication control circuitry 493 may transmit the signal having the specified frequency through the third conductive coil 880. When the digital pen 201 is positioned at a distance adjacent to the display 160, the transmitted signal may be induced to the second EMR communication control circuitry 443 of the digital pen 201. The induced signal may be received by the first EMR communication control circuitry 493 through the third conductive coil 880, and the processor 120 may sense the digital pen 201 by analyzing the received signal.

As another example, when the digital pen 201 supports an active EMR scheme, the second EMR communication control circuitry 443 may generate a signal having a specified frequency, and may transmit the generated signal through the second conductive coil 430. When the digital pen 201 is positioned at a distance adjacent to the display 160, the processor 120 may receive the signal having the specified frequency through the third conductive coil 880 and the first EMR communication control circuitry 493. The processor 120 may sense the digital pen 201 by analyzing the received signal.

When the digital pen 201 is sensed as being positioned on the display 160, the electronic device 101 may transmit the first signal including the identifier to the digital pen 201 through the first EMR communication control circuitry 493 and the third conductive coil 880 to the digital pen 201.

The digital pen 201 may transmit the second signal including the identifier to pair with the electronic device 101. When the digital pen 201 supports the passive EMR scheme, the digital pen 201 may transmit the second signal through the second wireless communication circuitry 442. When the digital pen 201 supports the active EMR scheme, the digital pen 201 may transmit the second signal through the second EMR communication control circuitry 443 and the second conductive coil 430.

The electro-magnetic resonance panel 890 may also include a separate conductive coil (e.g., a fourth conductive coil) configured to generate a signal for charging the battery 289 of the digital pen 201. The fourth conductive coil may be positioned in a partial area of the electro-magnetic resonance panel 890, rather than in the entire area of the electro-magnetic resonance panel 890, in order to reduce power consumption of the electronic device 101.

Figure 9:
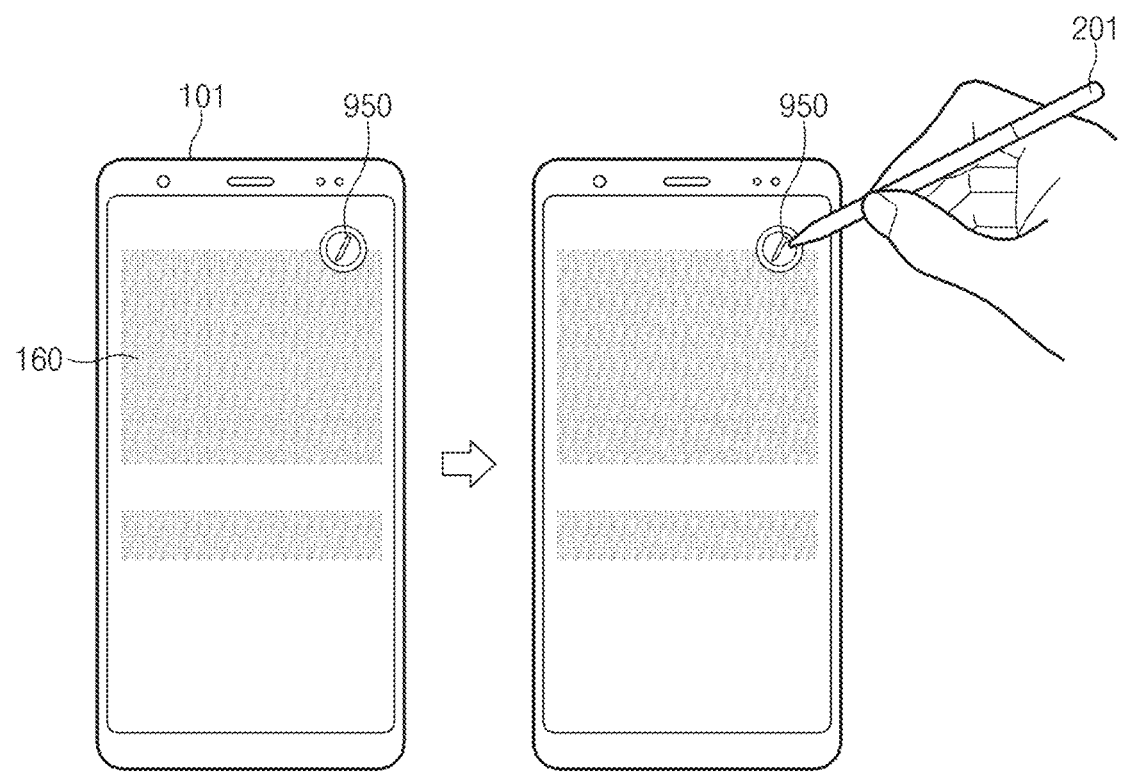
FIG. 9 illustrates an electronic device displaying a graphic user interface (GUI) for charging a battery of a digital pen, according to an embodiment.

FIG. 9 illustrates an electronic device displaying a GUI for charging a battery of a digital pen, according to an embodiment.

Referring to FIG. 9, the electronic device 101 displays a GUI 950 which indicates the position of a fourth conductive coil on the display 160 in order to guide the charging of the battery 289 of the digital pen 201. The position of the GUI 950 illustrated in FIG. 9 is provided only for the illustrative purpose, and the GUI 950 may be displayed at various positions depending on the position that the fourth conductive coil is disposed in the electro-magnetic resonance panel 890.

When the user moves the digital pen 201 to the GUI 950 to charge the battery 289, the electronic device 101 may sense that the digital pen 201 is positioned on the GUI 950 through an EMR scheme. In response to sensing that the digital pen 201 is positioned on the GUI 950, the electronic device 101 may apply a current to the fourth conductive coil to charge the battery 289.

The electronic device 101 may transmit the first signal including the identifier using the fourth conductive coil disposed at the position indicated by the GUI 950, while the battery 289 of the digital pen 201 is being charged. The digital pen 201 may receive the first signal through the second conductive coil 430 and the second EMR communication control circuitry 443 and may pair with the electronic device 101 based on the short-range wireless communication protocol by using the identifier included in the first signal.

Figure 10:
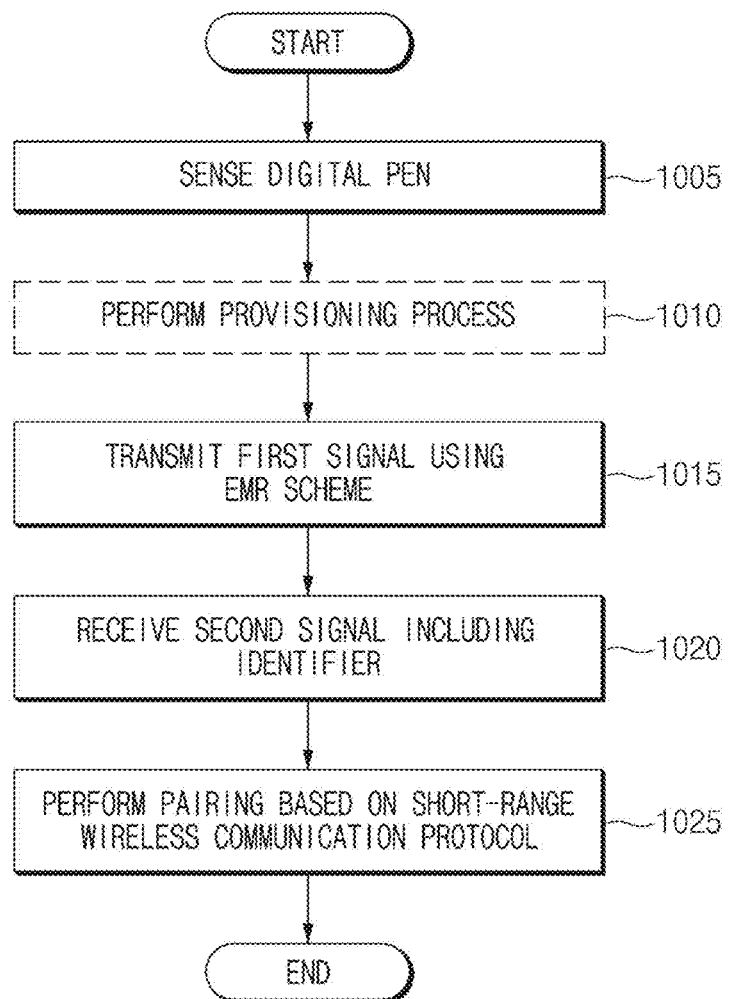
FIG. 10 is a flowchart illustrating a pairing operation of an electronic device with a digital pen, according to an embodiment.

FIG. 10 is a flowchart illustrating a pairing operation of an electronic device with a digital pen, according to an embodiment. For example, the operations illustrated in FIG. 10 may be performed by the electronic device 101 or the component of the electronic device 101.

Referring to FIG. 10, in step 1005, the electronic device 101 senses the digital pen 201. For example, the electronic device 101 may sense that the digital pen 201 is positioned inside the inner space 405, or sense that the digital pen 201 is positioned on the display 160. The electronic device 101 may sense the digital pen 201 through an EMR scheme.

In step 1010, the electronic device 101 performs a provisioning process. The provisioning process may include determining whether an external electronic device connected with the electronic device 101 is present. For example, when the digital pen 201 has been already connected with the electronic device 101, the electronic device 101 may omit steps 1015 to 1025 thereafter. Alternatively, the electronic device 101 may omit step 1010 and may perform step 1015.

In operation 1015, the electronic device 101 transmits a first signal including an identifier using an EMR scheme. For example, the electronic device 101 may transmit the is first signal through the first conductive coil 480, the third conductive coil 880, or the fourth conductive coil.

In step 1020, the electronic device 101 receives a second signal including the identifier from the digital pen 201. The identifier included in the second signal may have the same value as the identifier included in the first signal, or may have a value indicating the digital pen 201. When the digital pen 201 supports a passive EMR scheme, the electronic device 101 receives the second signal through the first wireless communication circuitry 492, and when the digital pen 201 supports an active EMR scheme, the electronic device 101 may receive the second signal through the first conductive coil 480, the third conductive coil 880, or the fourth conductive coil.

In step 1025, the electronic device 101 performs pairing with the digital pen 201 based on the short-range wireless communication protocol using the identifier included in the second signal.

Figure 11:
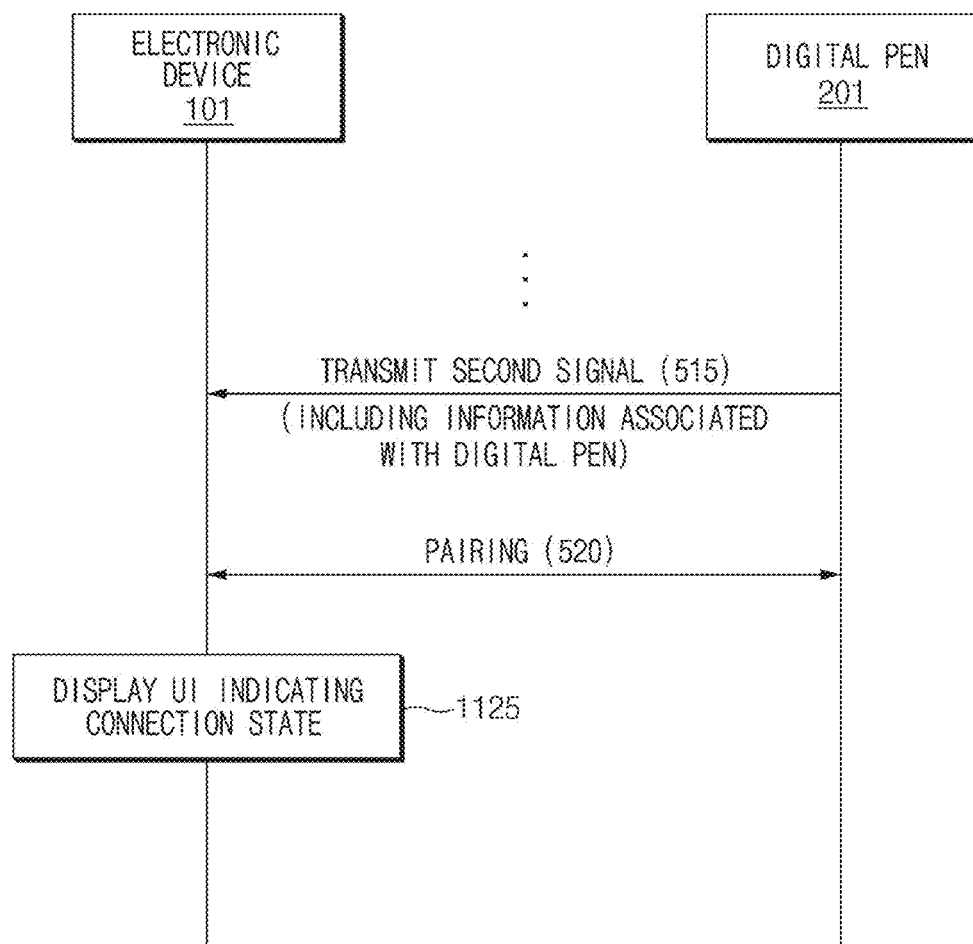
FIG. 11 is a signal flow diagram of an electronic device and a digital pen displaying a connection state with the digital pen, according to an embodiment.

FIG. 11 is a signal flow diagram of an electronic device and a digital pen displaying a connection state with the digital pen, according to an embodiment.

Referring to FIG. 11, the digital pen 201 may insert the information associated with the digital pen 201 into the second signal. The information associated with the digital pen 201 may indicate, for example, the color of the digital pen 201.

After the pairing is performed in operation 520, the electronic device 101 displays, on the display 160, a UI indicating the connection state of the digital pen 201 in operation 1125. For example, the electronic device 101 may change the background screen displayed on the display 160 to be in the color of the digital pen 201 indicated by the information associated with the digital pen 201. Alternatively, the electronic device 101 may display, on the display 160, at least one stroke in the same color as the color of the digital pen 201, based on a drawing input (e.g., a handwriting input or a stroke input) received from the digital pen 201.

Figure 12:
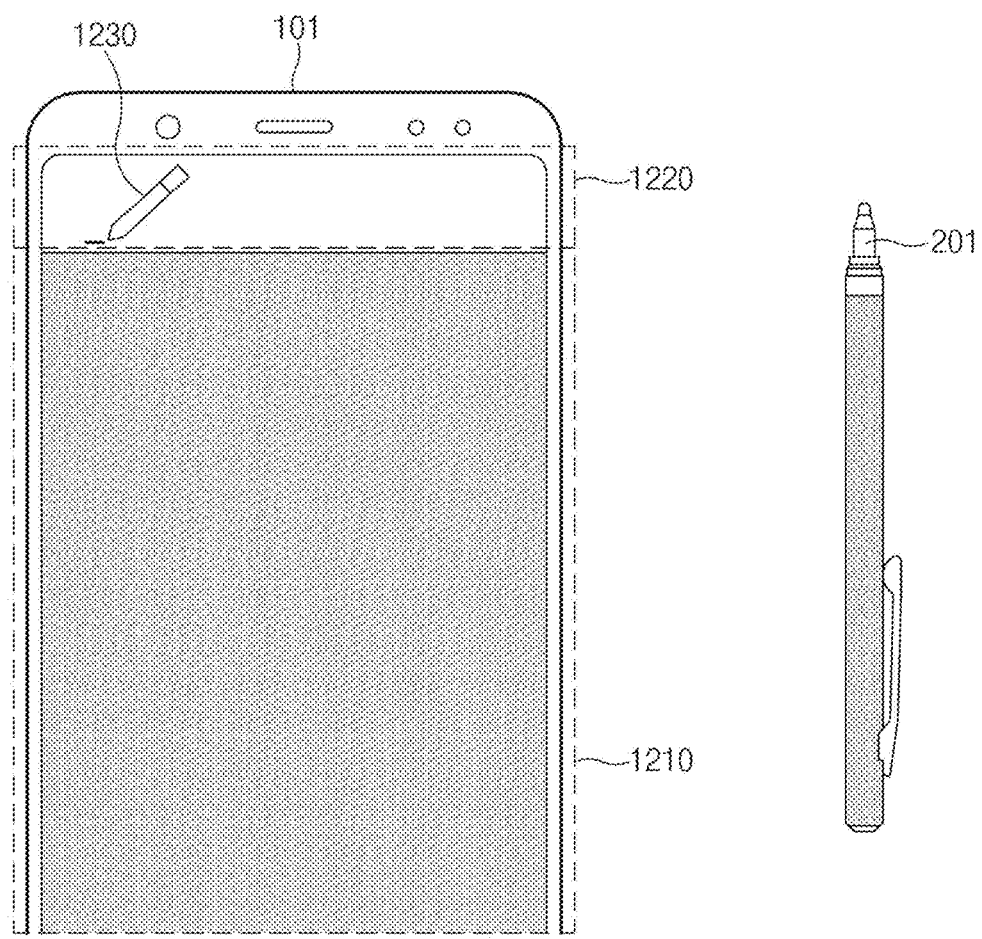
FIG. 12 illustrates a user interface (UI) indicating a connection state of an electronic device with a digital pen, according to an embodiment.

FIG. 12 illustrates a UI indicating a connection state of a digital pen, according to an embodiment.

Referring to FIG. 12, the electronic device 101 displays a UI indicating the connection state with the digital pen 201 on the display 160.

For example, the electronic device 101 may change the color of a background screen 1210 to the same color as the color of the digital pen 201. Information indicating the color of the digital pen 201 may be received through the second signal.

As another example, the electronic device 101 may display an icon 1230 of the digital pen 201 on a status bar 1220 (or notification bar) positioned in one area (e.g., top) of the display 160. The status bar 1220 may refer to an area for displaying the status of the electronic device 101 (e.g., at least one of a residual amount of a battery, a network usage status, or time). The electronic device 101 may control the icon 1230 to have the same color as the color of the digital pen 201.

Figure 13:
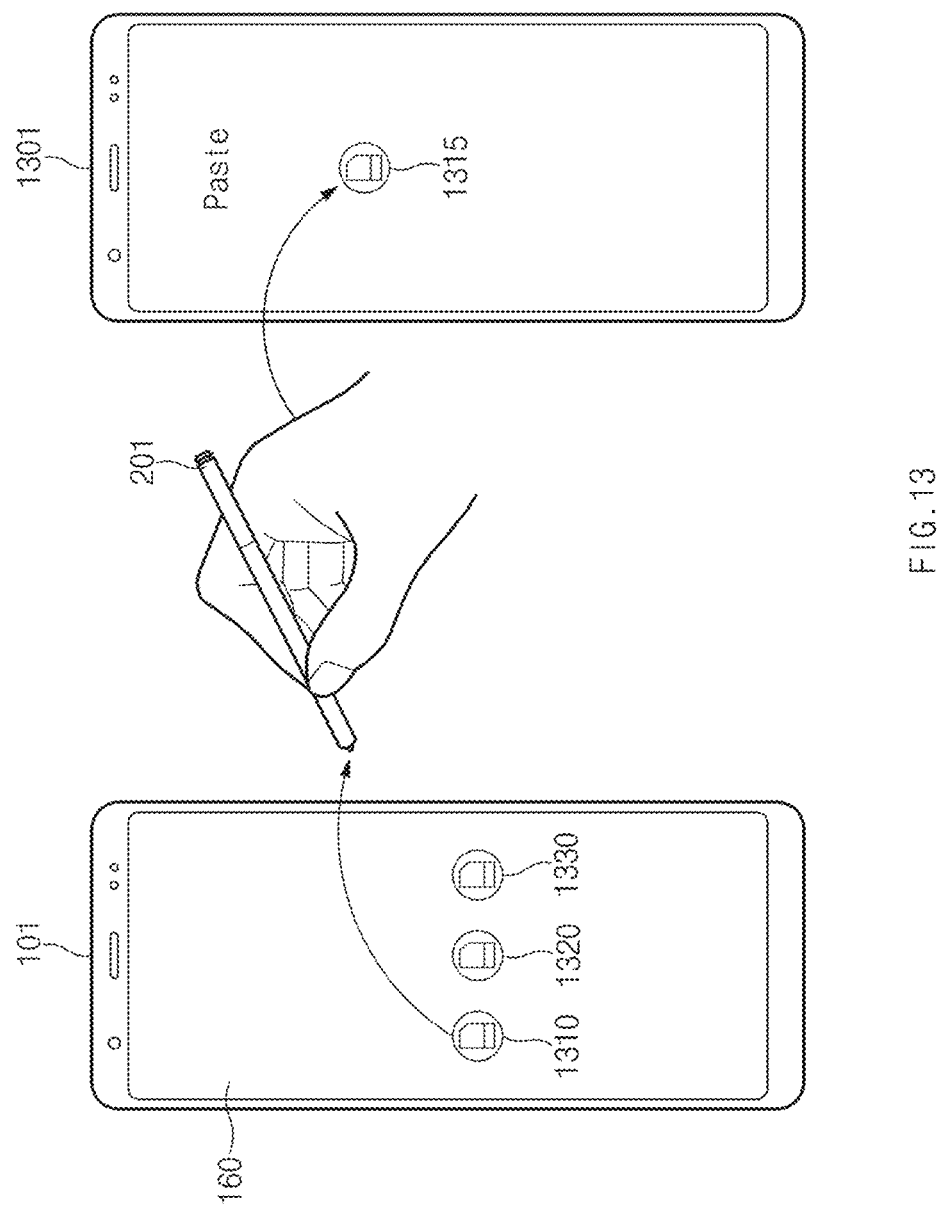
FIG. 13 illustrates an operation of transmitting a data file generated by an electronic device to an external electronic device by using a digital pen, according to an embodiment.

FIG. 13 illustrates an operation of transmitting a data file generated by an electronic device to an external electronic device by using a digital pen, according to an embodiment. In FIG. 13, it is assumed that the digital pen 201 and the electronic device 101 are connected with each other using a short-range wireless communication protocol.

Referring to FIG. 13, the electronic device 101 displays a plurality of data files 1310, 1320, and 1330 on the display 160. The electronic device 101 may receive an input of the digital pen 201, which selects one data file (e.g., 1310), among a plurality of data files. For example, the electronic device 101 may receive an input of the digital pen 201, which selects a data file based on an EMR scheme (e.g., a passive EMR scheme or an active EMR scheme).

The electronic device 101 may transmit, to the digital pen 201, a third signal including identification information (e.g., a uniform resource locator (URL) address) of the selected data file 1310. The third signal may be transmitted using an EMR scheme.

When the digital pen 201 is positioned at a distance (e.g., a distance that a signal based on the EMR scheme may be transmitted and received on the display of the external electronic device 1301, or a distance that a signal based on the short-range wireless communication protocol is transmitted and received) adjacent to the external electronic device 1301, the digital pen 201 may sense, through the EMR scheme, that the external electronic device 1301 does not pair with the digital pen 201.

The digital pen 201 may transmit a fourth signal including the identification information received through the third signal to the external electronic device 1301. For example, the digital pen 201 may transmit the fourth signal using the active EMR scheme.

The external electronic device 1301 may obtain a copy file 1315 of the data file 1310 from the electronic device 101 by using the identification information received from the digital pen 201. For example, the external electronic device 1301 may obtain the copy file 1315 by accessing a separate external server having the copy file 1315 using the identification information or by pairing with the electronic device 101 based on the short-range wireless communication protocol (e.g., Bluetooth or BLE).

As described above, an electronic device may include a housing including an inner space and a hole connected with the inner space, a first conductive coil positioned inside the housing, a first wireless communication circuitry positioned inside the housing, a first EMR communication control circuitry positioned inside the housing, at least one processor positioned inside the housing and operatively connected with the first EMR communication control circuitry and the first wireless communication circuitry, a memory positioned inside the housing and operatively connected with the at least one processor, wherein the memory may include instructions that, when executed, cause the at least one processor to transmit or receive a signal by using the first EMR communication control circuitry, and a stylus pen which is insertable into the inner space through the hole. The stylus pen may include a second conductive coil, a second EMR communication control circuitry electrically connected with the second conductive coil and transmitting or receiving a signal through the second conductive coil, a battery, and a second wireless communication circuitry.

The first wireless communication circuitry and the second wireless communication circuitry may support at least one of a Bluetooth® standard or a BLE standard.

The instructions may cause the at least one processor to transmit a first signal is including an identifier generated by the electronic device through the first EMR communication control circuitry and the first conductive coil, when the stylus pen is present in the inner space.

The second EMR communication control circuitry may receive the first signal through the second conductive coil, and the second wireless communication circuitry may transmit an advertising signal including the identifier.

The first wireless communication circuitry and the second wireless communication circuitry may pair with each other using the identifier, after the advertising signal is transmitted.

The second EMR communication control circuitry may receive the first signal through the second conductive coil, and may transmit a second signal including the identifier through the second conductive coil.

The first wireless communication circuitry and the second wireless communication circuitry may pair with each other by using the identifier, after the second signal is transmitted.

An electronic device may include a housing including an inner space and a hole connected with the inner space, a first conductive coil positioned inside the housing, a wireless communication circuitry positioned inside the housing, an EMR communication control circuitry positioned inside the housing, at least one processor positioned inside the housing and operatively connected with the EMR communication control circuitry and the wireless communication circuitry, and a memory positioned inside the housing and operatively connected with the at least one processor. The memory may include instructions that, when executed, cause the at least one processor to sense that a stylus pen is present in the inner space through the EMR communication control circuitry and the first conductive coil, to transmit a first signal including an identifier to the stylus pen through the EMR communication control circuitry and the first conductive coil, to receive a second signal including the identifier from the stylus pen through the wireless communication circuitry, and to perform a pairing operation with the stylus pen, based on a short-range wireless communication protocol using the received identifier.

The wireless communication circuitry may be configured to support at least one of a Bluetooth® standard or a BLE standard.

The second signal may include an advertising signal based on the BLE protocol. The first signal may have a header including the identifier, and the second signal may have a PDU including the identifier.

The electronic device may further include a display panel viewed through a portion of the housing, an electro-magnetic resonance panel positioned at a lower end of the display panel, and a third conductive coil positioned inside the electro-magnetic resonance panel. The instructions may cause the at least one processor to transmit the first signal using the EMR communication control circuitry and the third conductive coil in response to sensing that the stylus pen is positioned on the display panel using the electro-magnetic resonance panel.

The electro-magnetic resonance panel may further include a fourth conductive coil generate a signal for charging a battery of the stylus pen. The instructions may cause the at least one processor to display a GUI indicating an area corresponding to the fourth conductive coil, through the display panel, and to transmit the signal for charging the battery of the stylus pen using the EMR communication control circuitry and the fourth conductive coil, in response to sensing that the stylus pen is positioned on the GUI.

The second signal may include information associated with the stylus pen. The instructions may cause the at least one processor to display a GUI indicating a connection state with the stylus pen, based at least on the received information associated with the stylus pen, when the electronic device pairs with the stylus pen.

The information associated with the stylus pen may include information on a color of the stylus pen; and at least one of information on a color of a background screen and information on a color of an icon for the stylus pen, which are displayed on the display panel, is based on the information on the color of the stylus pen.

The instructions may cause the at least one processor to receive an input of selecting a file, which is stored in the electronic device, from the stylus pen, through the display panel and the EMR communication control circuitry, to transmit identification information on the selected file to the stylus pen through the EMR communication control circuitry in response to the received input, and to perform pairing with an external electronic device using the wireless communication circuitry, based at least on the identification information.

A method of an electronic device, may include sensing that a stylus pen is present in an inner space of the electronic device through an EMR scheme, transmitting a first signal including an identifier to the stylus pen through the EMR scheme, receiving a second signal including the identifier from the stylus pen, based on a short-range wireless communication protocol, and performing a pairing operation with the stylus pen using the identifier, based on the short-range wireless communication protocol.

The short-range wireless communication protocol may support at least one of a Bluetooth standard® or a Bluetooth low energy (BLE) standard.

The method may further include sensing that the stylus pen is positioned on a display panel of the electronic device, through the EMR scheme.

The second signal may include information associated with the stylus pen, and the method further may include displaying, on a display panel, a GUI indicating a connection state with the stylus pen, based at least on the received information associated with the stylus pen, when the electronic device pairs with the stylus pen.

The method may further include receiving an input of selecting a file, which is stored in the electronic device, from the stylus pen through the EMR scheme, transmitting identification information on the selected file to the stylus pen through the EMR scheme in response to the received input, performing pairing through an external electronic device and a wireless communication circuitry, based on the transmitted identification information, and transmitting the selected file, which corresponds to the transmitted identification information, to the paired external electronic device, through the wireless communication circuitry.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electro-magnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or to uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As described above, an electronic device may pair with a stylus pen using a short-range wireless communication protocol, without a user input.

The electronic device may transmit a data file, which is generated by the electronic device, to another electronic device by using the stylus pen.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
    a housing including an inner space and a hole connected with the inner space;
    a display panel;
    a first conductive coil;
    a first wireless communication circuitry configured to support a Bluetooth communication protocol;
    a first electro-magnetic resonance (EMR) communication control circuitry;
    a processor positioned operatively connected with the first EMR communication control circuitry and the first wireless communication circuitry;
    a memory operatively connected with the processor, wherein the memory stores instructions that, when executed, cause the processor to transmit or receive a signal by using the first EMR communication control circuitry; and
    a stylus pen that is insertable into the inner space of the housing through the hole,
    wherein the stylus pen includes:
        a second conductive coil;
        a second EMR communication control circuitry electrically connected with the second conductive coil, wherein the second EMR communication control circuitry is configured to receive a signal including an identifier for pairing through the second conductive coil according to an EMR scheme;
        a battery; and
        a second wireless communication circuitry configured to pair with the first wireless communication circuitry using the Bluetooth communication protocol and the identifier for pairing, and
    wherein the instruction that, when executed, further cause the processor to:
        receive an input for selecting a file, which is stored in the electronic device, from the stylus pen using the EMR scheme;

transmit indentification information on the selected file to the stylus pen using the EMR scheme, in response to the recieved input;

perform pairing with an external electronic device using the first wireless communication circuitry, based on the transmitted indentification information; and transmit the selected file which corresponds to the transmitted indentification information, to the paired external electronic device, using the first wireless communication circuitry.

2. The electronic device of claim 1, wherein the instructions further cause the processor to transmit, through the first EMR communication control circuitry and the first conductive coil, a first signal including an identifier generated by the electronic device, when the stylus pen is inserted in the inner space.

3. The electronic device of claim 2, wherein the second EMR communication control circuitry is further configured to receive the first signal through the second conductive coil, and wherein the second wireless communication circuitry is configured to transmit an advertising signal including the identifier.

4. The electronic device of claim 3, wherein the first wireless communication circuitry and the second wireless communication circuitry are further configured to pair with each other using the identifier, after the advertising signal is transmitted.

5. The electronic device of claim 2, wherein the second EMR communication control circuitry is further configured to:

receive the first signal through the second conductive coil, and transmit a second signal including the identifier through the second conductive coil.

6. The electronic device of claim 5, wherein the first wireless communication circuitry and the second wireless communication circuitry are further configured to pair with each other by using the identifier, after the second signal is transmitted.

7. An electronic device, comprising:
a housing including an inner space and a hole connected with the inner space;
a first conductive coil;
a wireless communication circuitry configured to support a Bluetooth communication protocol;
an electro-magnetic resonance (EMR) communication control circuitry;
a processor operatively connected with the EMR communication control circuitry and the wireless communication circuitry; and
a memory operatively connected with the processor, wherein the memory includes instructions that, when executed, cause the processor to:
sense, using the EMR communication control circuitry and the first conductive coil, that a stylus pen is inserted in the inner space through the hole,
transmit, using the EMR communication control circuitry and the first conductive coil, a first signal including an identifier for pairing to the stylus pen according to an EMR scheme,
receive, using the wireless communication circuitry, a second signal including the identifier from the stylus pen,
perform a pairing operation with the stylus pen, based on the Bluetooth communication protocol, using the received identifier,
receive an input for selecting a file, which is stored in the electronic device, from the stylus pen, through the display panel and the EMR communication control circuitry,
transmit identification information on the selected file to the stylus pen through the EMR communication control circuitry, in response to the received input, and
perform pairing with an external electronic device using the wireless communication circuitry, based at least on the identification information.

8. The electronic device of claim 7, wherein the first signal has a header including the identifier, and the second signal has a packet data unit including the identifier.

9. The electronic device of claim 7, further comprising:
an electro-magnetic resonance panel positioned at a lower end of the display panel; and
a third conductive coil positioned inside the electro-magnetic resonance panel,
wherein the instructions further cause the processor to transmit the first signal using the EMR communication control circuitry and the third conductive coil, in response to sensing that the stylus pen is positioned on the display panel using the electro-magnetic resonance panel.

10. The electronic device of claim 9, wherein the electro-magnetic resonance panel further includes a fourth conductive coil configured to generate a signal for charging a battery of the stylus pen, and
wherein the instructions further cause the processor to:
display a graphic user interface (GUI) indicating an area corresponding to the fourth conductive coil, through the display panel; and
transmit the signal for charging the battery of the stylus pen using the EMR communication control circuitry and the fourth conductive coil, in response to sensing that the stylus pen is positioned on the GUI.

11. The electronic device of claim 7, wherein the second signal includes information associated with the stylus pen, and
wherein the instructions further cause the processor to display a graphic user interface (GUI) indicating a connection state with the stylus pen, based on the received information associated with the stylus pen, when the electronic device pairs with the stylus pen.

12. The electronic device of claim 11, wherein the information associated with the stylus pen includes information on a color of the stylus pen, and
wherein at least one of information on a color of a background screen and information on a color of an icon for the stylus pen, which are displayed on the display panel, is based on the information on the color of the stylus pen.

13. A method of an electronic device, the method comprising:
sensing that a stylus pen is inserted in an inner space of the electronic device using an electro-magnetic resonance (EMR) scheme;
transmitting a first signal including an identifier for pairing to the stylus pen using the EMR scheme;
receiving a second signal including the identifier from the stylus pen, based on a Bluetooth wireless communication protocol;
performing a pairing operation with the stylus pen using the identifier, based on the Bluetooth wireless communication protocol;

receiving an input for selecting a file, which is stored in the electronic device, from the stylus pen using the EMR scheme;

transmitting identification information on the selected file to the stylus pen using the EMR scheme, in response to the received input;

performing pairing with an external electronic device using a wireless communication circuitry, based on the transmitted identification information, and transmitting the selected file, which corresponds to the transmitted identification information, to the paired external electronic device, using thr wireless communication circuitry.

14. The method of claim 13, further comprising sensing that the stylus pen is positioned on a display panel of the electronic device, using the EMR scheme.

15. The method of claim 13, wherein the second signal further includes information associated with the stylus pen, and wherein the method further includes displaying, on a display panel, a graphic user interface (GUI) indicating a connection state with the stylus pen, based at least on the received information associated with the stylus pen, when the electronic device pairs with the stylus pen.

* * * * *